(12) United States Patent
Stochosky et al.

(10) Patent No.: US 9,965,132 B2
(45) Date of Patent: May 8, 2018

(54) PRESENTING TEXT MESSAGES

(75) Inventors: Michael Stochosky, San Francisco, CA (US); Justin Wood, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1098 days.

(21) Appl. No.: 12/135,105

(22) Filed: Jun. 6, 2008

(65) Prior Publication Data

US 2008/0307322 A1    Dec. 11, 2008

Related U.S. Application Data

(60) Provisional application No. 60/942,976, filed on Jun. 8, 2007.

(51) Int. Cl.
*G06F 3/14* (2006.01)
*G06F 3/0481* (2013.01)
*H04M 1/725* (2006.01)

(52) U.S. Cl.
CPC ........ *G06F 3/0481* (2013.01); *H04M 1/72544* (2013.01); *H04M 1/72552* (2013.01)

(58) Field of Classification Search
CPC ............. G06F 3/14; G06F 3/17; G06F 3/0481
USPC ........................ 715/200–277, 700–867, 513; 700/701–866; 709/201–229; 705/50–111; 345/30–111, 173; 370/352; 719/328
See application file for complete search history.

(56) References Cited

U.S. PATENT DOCUMENTS

| | | | |
|---|---|---|---|
| 2004/0205559 A1* | 10/2004 | Sirhall | 715/513 |
| 2004/0268263 A1* | 12/2004 | Van Dok et al. | 715/733 |
| 2006/0168073 A1* | 7/2006 | Kogan et al. | 709/206 |
| 2006/0253787 A1* | 11/2006 | Fogg | 715/752 |
| 2007/0041370 A1* | 2/2007 | Cleveland | 370/352 |
| 2008/0055269 A1* | 3/2008 | Lemay et al. | 345/173 |
| 2008/0201437 A1* | 8/2008 | Ludwig et al. | 709/206 |
| 2008/0250107 A1* | 10/2008 | Holzer et al. | 709/206 |
| 2008/0307061 A1* | 12/2008 | Jacovi et al. | 709/206 |
| 2009/0178062 A1* | 7/2009 | Westen | 719/328 |

* cited by examiner

*Primary Examiner* — Ruay Ho
(74) *Attorney, Agent, or Firm* — Blank Rome LLP

(57) ABSTRACT

In an instant messaging application, a message container (e.g., a stylized text bubble) is provided for indicating that an activity has occurred in a non-foreground chat. The message container can be displayed in the chat where the activity occurred. The message container can contain a portion of the message (e.g., the beginning of the message). The message container can contain a summary of the message. The message container can have an arbitrary shape or appearance. The user can define or select the appearance of the message container.

22 Claims, 5 Drawing Sheets

PRESENTING TEXT MESSAGES

CROSS-REFERENCE TO RELATED APPLICATIONS

This application claims priority to U.S. Provisional Patent Application Ser. No. 60/942,976 filed Jun. 8, 2007, and entitled "Presenting Text Messages," the contents of which are incorporated herein by reference.

TECHNICAL FIELD

This subject matter generally relates to message delivery.

BACKGROUND

Instant message communication systems allow a user to chat electronically with other users. Generally each chat conversation is associated with particular users and a text message sent from one user is broadcast to other users in the chat conversation. Such communication systems typically present the chat conversation to a user as a list of text messages that have been exchanged during the chat conversation. Each such chat conversation that a user can be involved in is represented as a separate list. When a new message is received for a particular conversation the message is added to the list that corresponds with the particular conversation. If the list is hidden or minimized the user must cause the list to be presented so as to read the new message.

SUMMARY

In an instant messaging application, a message container (e.g., a stylized text bubble) is provided for indicating that an activity has occurred in a non-foreground chat. The message container can be displayed in the chat where the activity occurred. The message container can contain a portion of the message (e.g., the beginning of the message). The message container can contain a summary of the message. The message container can have an arbitrary shape or appearance. The user can define or select the appearance of the message container.

Particular embodiments of the subject matter described in this specification can be implemented to realize one or more of the following advantages. Instant messages can be presented to their receiver using a minimum of screen space. The presentation of an instant message is such that it is obvious who sent the message. Multiple instant messages from multiple senders can be viewed simultaneously without any user intervention from the receiver. A receiver of multiple instant messages can examine previews of the messages and so make a prioritization about which messages to respond to.

The details of one or more embodiments of the invention are set forth in the accompanying drawings and the description below. Other features, aspects, and advantages of the invention will become apparent from the description, the drawings, and the claims.

DETAILED DESCRIPTION

Figure 1:
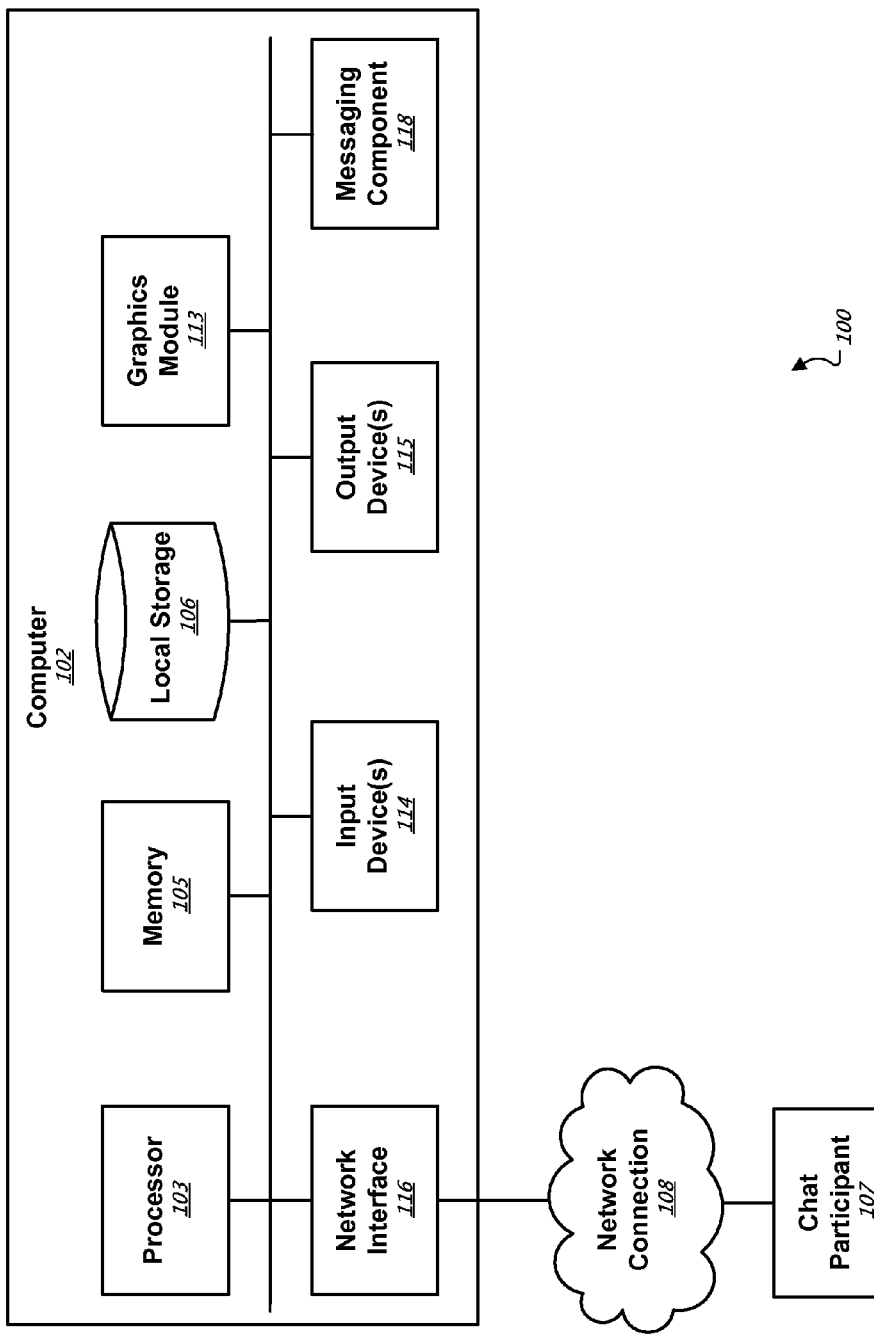
FIG. 1 is a block diagram of an example of an architecture for displaying text bubbles in a messaging system.

FIG. 1 is a block diagram of an architecture 100 (e.g., a hardware architecture) for displaying text bubbles in a messaging system. The architecture 100 includes a personal computer 102 communicatively coupled to a chat participant 107 via a network interface 116 and a network 108 (e.g., local area network, wireless network, Internet, intranet, etc.). The computer 102 generally includes a processor 103, memory 105, one or more input devices 114 (e.g., keyboard, mouse, video recording device, audio recording device, etc.) and one or more output devices 115 (e.g., a display device, speaker device, etc.). A user interacts with the architecture 100 via the input and output devices 114, 115. Architecture 100 can include hardware, software, and combinations of the two.

The computer 102 also includes a local storage device 106 and a graphics module 113 (e.g., graphics card) for storing information and generating graphical objects, respectively. The local storage device 106 can be a computer-readable medium. The term "computer-readable medium" refers to any medium that includes data and/or participates in providing instructions to a processor for execution, including without limitation, non-volatile media (e.g., optical or magnetic disks), volatile media (e.g., memory), and transmission media. Transmission media includes, without limitation, coaxial cables, copper wire, fiber optics, and computer buses. Transmission media can also take the form of acoustic, light or radio frequency waves.

While message exchanges are described herein with respect to a personal computer 102, it should be apparent that the disclosed implementations can be incorporated in, or integrated with, any electronic device that has a user interface, including without limitation, portable and desktop computers, servers, electronics, media players, game devices, mobile phones, email devices, personal digital assistants (PDAs), embedded devices, televisions, other consumer electronic devices, etc. In addition, the chat participant 107, while described herein with respect to another personal computer, can also be incorporated in or integrated with any electronic device that has a user interface.

Systems and methods are provided for exchanging messages. The systems and methods can be stand alone or otherwise integrated into a more comprehensive application. In the materials presented below, an integrated system and method for exchanging messages is disclosed.

One of ordinary skill in the art will recognize that the engines, methods, processes and the like that are described can themselves be an individual process or application, part of an operating system, a plug-in, an application or the like. In one implementation, the system and methods can be implemented as one or more plug-ins that are installed and run on the personal computer 102. The plug-ins are configured to interact with an operating system (e.g., MAC OS® X, WINDOWS XP, LINUX, etc.) and to perform the various functions, as described with respect to the Figures. A system and method for exchanging messages can also be implemented as one or more software applications running on the computer 102. Such a system and method can be characterized as a framework or model that can be implemented on various platforms and/or networks (e.g., client/server networks, wireless networks, stand-alone computers, portable electronic devices, mobile phones, etc.), and/or embedded or bundled with one or more software applications (e.g., email, media player, browser, etc.).

The computer 102 includes a messaging component 118 that provides the user with the capability to communicate via messages, for example using instant messages sent to and received from the chat participant 107. In some implementations, the messaging component 118 includes a graphical user interface. The graphical user interface can present messages, such as instant messages, in styles and/or formats that can be more visually pleasing to the user than a plain text representation of the text message. Moreover, the look and feel of graphically displaying messages can aid the user in tracking the flow and current state of received messages. For example, an instant message (or a summary or truncation thereof) can be enclosed in a text bubble in proximity to the name or image representation of a contact in a contact list. Each contact list represents a potential chat participant from which messages can be received. When a message is received and presented in a text bubble in proximity to the representation of the sender, the receiving user can readily associate a new message with the sender of the message. Moreover, the text bubbles can aid the receiving user in managing messages received among multiple contacts (e.g., several other chat participants) with whom the user can be communicating. The messaging component 118 can present a text bubble, for example, after determining that there is no visible representation of a corresponding chat conversation with the sender. For example, while a received message can be added to a dialog window (or other such user interface on a computer) containing an ongoing chat conversation, a text bubble can be used instead when no such chat conversation is currently active or visible (e.g., there is no chat conversation window or the window is not visible or not in the foreground).

As used in the following description a text bubble refers to any message container wherein a message consisting of text, video and/or imagery can be presented in proximity to a visual representation of the message sender. In some implementations, the text bubble can appear as a stylized bubble or a conventionally shaped (e.g., rectangular) pop-up.

In various implementations, the messaging component 118 also allows users to control the visual characteristics of text bubbles that are used to present messages received from or sent to a chat participant 107. For example, the user can control the text style (e.g., size, color, font, etc.) and bubble style (e.g., bubble color and shape). In some implementations, the user can further control text bubble behavior, such as the length of time a text bubble is displayed. In some implementations, the user can further control arrangement of text bubbles, such as stacking multiple text bubbles each presenting a single received message, or alternatively, presenting multiple messages from a sender within a single text bubble. In other implementations, other visual arrangements of bubbles can be selected. In some implementations, the user can specify keyboard shortcuts, for example, for moving or removing a text bubble from the screen.

Figure 2:
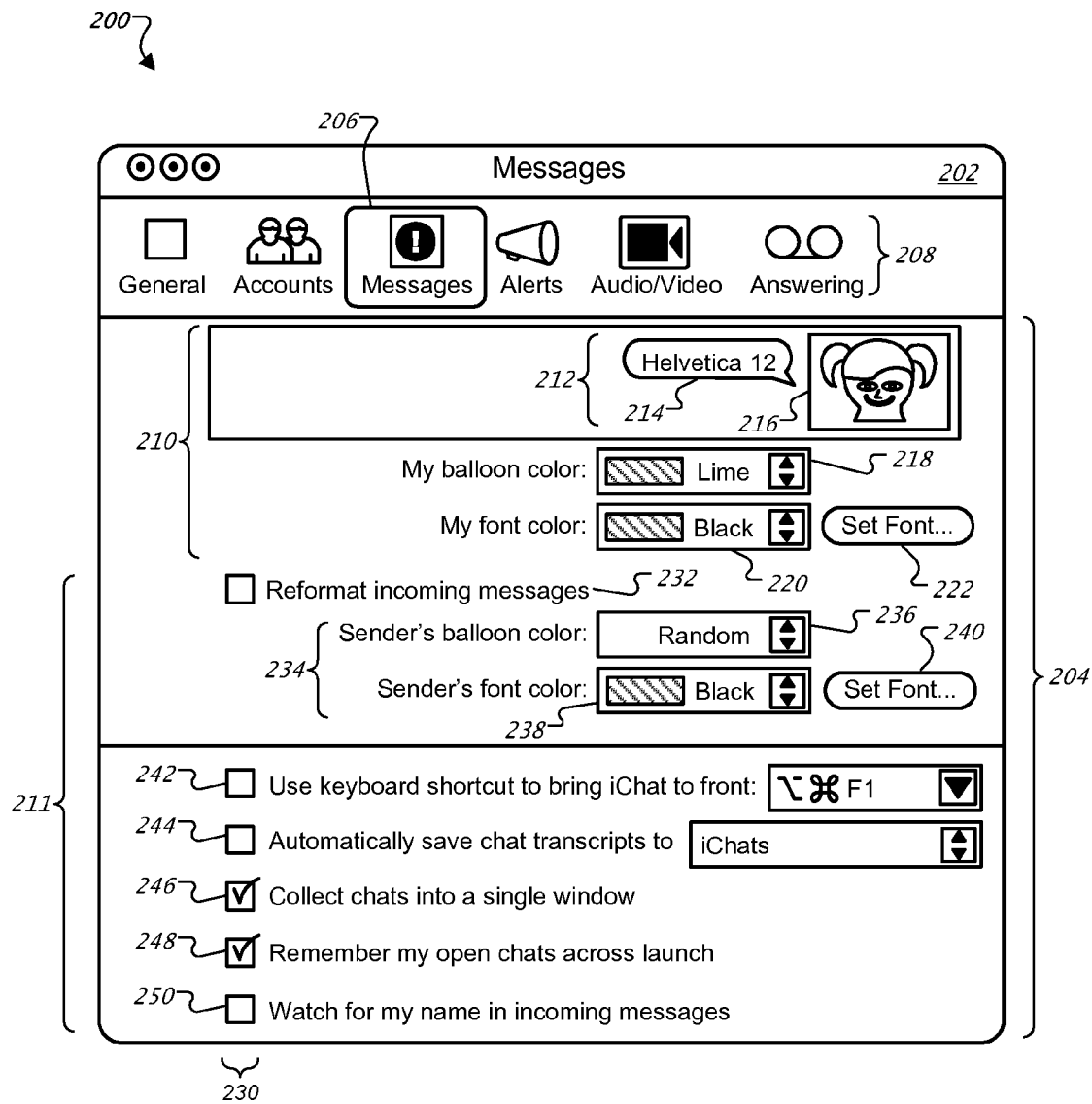
FIG. 2 is a screen shot depicting an example of a dialog for defining characteristics of text bubbles.

FIG. 2 is a screen shot 200 depicting an example of a dialog for defining visual characteristics of text bubbles. A text bubble settings window 202 includes text bubble settings 204 that can be used to control the look and feel of text bubbles used in the messaging system 118, such as an instant messaging (IM) system. The text bubble settings 204 can be displayed on a messages tab 206 that can be, for example, one of several tabs or options 208 included in the messaging system 118.

As depicted in FIG. 2, text bubble settings 204 include options for controlling the visual characteristics of text bubbles. For example, the text bubble settings 204 include a sender settings area 210 and a receiving settings area 211. In some implementations, other layouts of settings can be used. In other implementations, controls can exist for setting or restoring system defaults, such as default bubble and format styles associated with the messaging system.

The sender settings area 210 allows a user to customize outgoing bubble settings 212. Outgoing bubble settings 212 affect the appearance of text bubbles used to present messages sent by the user to a chat participant (e.g., These messages are presented in a text bubble to a message recipient, such as the chat participant 107). In particular, the outgoing bubble settings 212 can include a bubble display 214 that indicates the name of the font (e.g., Helvetica 12) and depicts the shape (e.g., round, square, jagged, thought-bubble or another shape) and color (e.g., lime or another color) of outgoing text bubbles. Other bubble characteristics are possible. Moreover, the outgoing bubble settings 212 can include an image 216 (e.g., a photo of the user) that can be displayed with the text bubbles. In some implementations, additional controls can exist in the text bubble settings window 202 for browsing and selecting photo images stored on the computer or available though the network 108 that can be selected for the image 216. In some implementations, messaging component 118 can provide the ability to select a generic face image for the image 216 based on gender, age, nationality, etc.

A balloon color setting 218 can allow the user to set the color (e.g., lime or another color) of outgoing text bubbles. For example, the user can be able to type in the name of a color into the text field of the color setting 218. In another example, the user can designate a bubble color by clicking on the up-down arrow control of the color setting 218 and then selecting a color from a list of colors (e.g., from a drop-down list, scrollable list, or the like).

A font color setting 220 can allow the user to control the color of the text in outgoing text bubbles. For example, the user can be able to type in the name of a color or select a color from a list (e.g., in a drop-down list or other scrollable list). The color selection can be displayed in the bubble display 214, such as the color of text in which the current text bubble font (e.g., Helvetica 12) is written.

A set font control 222 can allow the user to choose a font for outgoing text bubbles. For example, by selecting the set font control 222, a list of available fonts can be displayed (e.g., in a scrollable list) from which the user can make a selection. The font selected by the user can be identified in the bubble display 214.

The receiving settings area 211 can include several checkboxes 230 for enabling and/or disabling controls for text bubbles received from other users. For example, the user can check (or uncheck) checkboxes 230 to control the behavior of instant messages received from a chat participant 107. In some implementations, a separate set of checkboxes 230 (as well as other controls within the text bubble settings window 202) can exist for each of the user's contacts. Other similar or different types of checkboxes can exist in the sender settings area 210, but are not depicted in FIG. 2.

In some implementations, by selecting one or more checkboxes 230, particular areas in the receiving settings area 211 can become inactive or "grayed out." For example, if a reformat incoming messages checkbox 232 is turned off, corresponding fields 234 can be grayed out by the system. Subsequently checking the checkbox 232 can make the fields 234 active again.

The checkbox 232 can be used to control the look and feel of text bubbles used to present messages received from other users, such as instant messages received from a chat participant 107. A sender's balloon (or bubble) color control 236 can be used, for example by the recipient, to override the color specified by the sender. For example, as depicted, the sender's balloon (or bubble) color can be set to "Random." Specifically, although the sender can specify a particular color for a text bubble (e.g., blue), the user's system can automatically generate a random color for it for display on the user's computer. A sender's font color setting 238 and a set font control 240 can be used to override the format of the text displayed in text bubbles received from other users.

A keyboard shortcut control 242 can be used to identify a sequence of keystrokes for bringing a messaging window to the front. For example, if a text bubble is received from a chat participant 107, the user can use the key sequence defined in control 242 to display the window (or other such display) containing the message chain for the corresponding contact. Other controls not depicted in FIG. 2 can be used to define other shortcut keys, such as those that can be used to minimize and restore text bubbles.

A save-to path 244 can be used to designate a computer folder (or other such file container) for storing saved message transcripts. For example, by designating a folder named "iChats", the user's instant messages can be stored in a corresponding folder on the user's computer. In some implementations, the save-to path 244 can include a browsing control or other such feature to traverse file hierarchies on the computer to aid in selecting an appropriate save-to folder. In some implementations, the save-to folder designated by the save-to path 244 can be further organized into sub-folders, such as separate ones named for each contact.

A "Collect chats into single window" checkbox 246 can be used to group open chats (e.g., message threads) into a single window. If the checkbox 246 is not checked and the user is messaging multiple chat participants, each message thread can appear in a separate window.

A "Remember open chats across launch . . . " checkbox 248, if checked, can allow the message threads to be known to a subsequent (to the first) launch of the messaging system.

Using a "Watch for my name . . . " checkbox 250, the user can automatically screen messages that include words corresponding to the user's identity (e.g., name, username, email address, or other alias associated with the user). In some implementations, the messaging system can highlight such messages or in some way treat them differently from other messages. For example, if a user identified as 'John' or 'jsmith' or 'jsm@mail.com' receives a message from another chat participant that includes the text 'John', 'jsmith' or 'jsm@mail.com', then the message can be accentuated (e.g., appear glowing, highlighted or blinking). In some implementations, other checkboxes can be included with the checkboxes 230 that allow the user to specify that only messages containing the user's name are displayed using text bubbles.

In some implementations, other settings affecting the appearance of text bubbles can be specified. For example, in addition to the color inside a text bubble, the system can allow the user to specify patterns, such as stripes, plaids, images, or other patterns that are used as the background of the bubble. In another example, the appearance of text bubbles can be based on one of several bubble styles or shapes. For example, user-selectable bubble shapes can include rounded bubbles (e.g., to signify normal conversation), stacked ovals of increasing size (e.g., to represent thought or ideas) and jagged edge bubbles (e.g., to signify shock, exclamation, a scream or the like). In some implementations, the border color, thickness, and/or line style (e.g., solid, dashed, etc.) can be specified. Any or all such text bubble appearance attributes can be used for text bubbles that are sent and/or received by the user.

Figure 3:
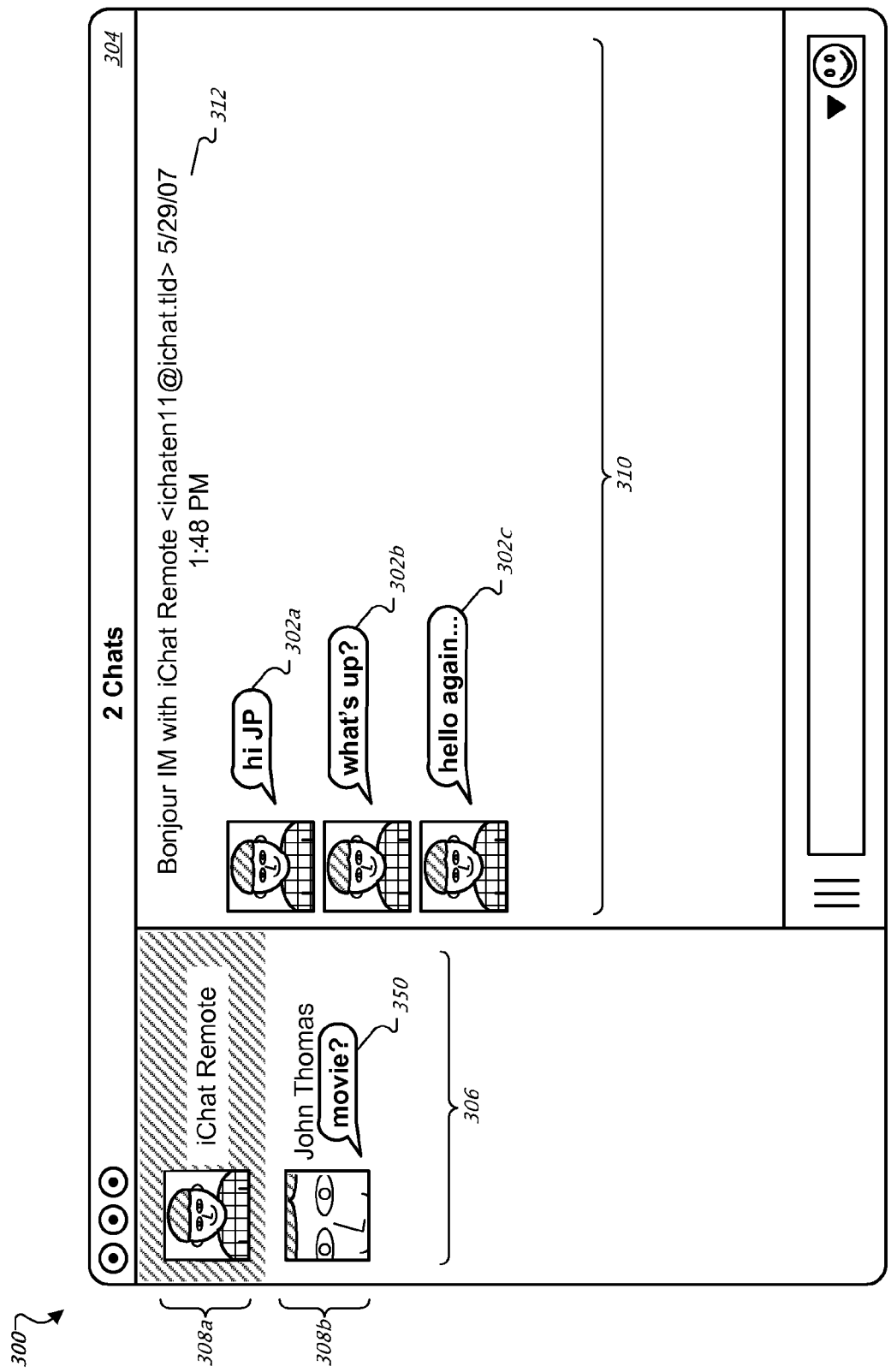
FIGS. 3 and 4 are screen shots depicting examples of text bubbles displayed in a messaging system.

FIG. 3 is a screen shot 300 depicting examples of text bubbles displayed in a messaging system. As shown, messages 302a-302c can be displayed in a window 304 when a list of contacts 306 is displayed. Each of the messages 302a-302c can contain text corresponding to a message received from the chat participant 107. A text bubble 350 can be presented in proximity to a contact 308b when a message is received from the contact without there being an active, visible or foreground chat conversation associated with the contact 308b. When the message is short enough (e.g., "movie?"), the entire portion of the text message can be included in the text bubble. Otherwise, a sample of the message can be presented in the text bubble. The sample can correspond to a beginning number of words or characters of the message. Alternatively, the sample can be a summarization determined for the received text message. The color and format of each text bubble 350 can depend on the settings pre-defined by the user, such as by using the text bubble settings window 202 (FIG. 2).

As depicted, the list of contacts 306 includes two contacts: "iChat Remote" contact 308a and "John Thomas" contact 308b. The list of contacts 306 can be displayed in a window that is separate, for example, from the window(s) containing current message threads (e.g., chat conversations) associated with each contacts 308a and 308b. In this way, text bubbles can be displayed and presented in a manageable format in a central display without the user (e.g., the receiver of the messages) having to access one or more other windows.

Each of the contacts 308a and 308b can include a displayable image associated with that contact. For example, the contact images can be stored locally on the computer and accessed as needed, or they can be received by the chat participant 107, such as when they send messages to the user.

In some implementations, the list of contacts 306 also includes contacts for which messaging is not currently active. For example, a contact can appear in the list 306 even if the user is not currently conducting a messaging session with the contact. In this case, an inactive contact in the list 306 can be indicated by graying out the contact name. In some implementations, the actively-messaged contacts can automatically sort to the top of the list.

As depicted in FIG. 3, the "iChat Remote" contact 308a is shaded to indicate that the contact has been selected by the user. In particular, the user can select a specific contact in the list 306 to display the chat conversation associated with the selected contact. For example, when the "iChat Remote" contact 308a is selected, the messages 302a-302c are displayed in a chat conversation area 310. The chat conversation area 310 presents messages sent and received during a chat conversation between the user and the selected chat participant. The image associated with the contact (e.g., the contact's photo) is displayed next to each of the messages 302a-302c. A contact identification message 312 is displayed above the messages 302a-302c and can serve to identify the selected contact. The contact identification message 312 can include, for example, the name of the contact, the contact's identifier in the messaging system, and the date and time at which the messaging began. In some implementations, the date and time can be used to identify the last time a message was received from the contact.

In some implementations, the user can highlight more than one contact in the list 306. For example, by highlighting the "John Thomas" contact 308b in addition to the "iChat Remote" contact 308a, any messages received from the "John Thomas" contact 308b can also be displayed in the conversation area 310.

If a message is received from a contact that is not currently highlighted in the list 306 (e.g., there is no visible chat conversation area associated with the contact), the message can be presented in a text bubble in proximity to the contact in the list 306. For example, as depicted, the "movie?" text bubble 350 represents a message received from the "John Thomas" contact 308b. Messages are displayed in the text bubble 350 during the time that the contact 308b is not highlighted.

In some implementations, bubbles can be removed from display either by the user or automatically, or in some combination thereof. For example, a text bubble can contain a control (e.g., a clickable close or dismiss button) that the user can easily use to remove a bubble. In some implementations, additional controls can exist for minimizing and subsequently restoring text bubbles. For example, the user can want to shrink the display for a bubble but not remove presentation of the bubble completely. In other implementations, the messaging component 118 can automatically remove (or otherwise hide or delete) the presentation of the text bubble after a determined period of time has elapsed since the presentation of the text bubble. For example, a user-configurable bubble expiration setting can be included on the text bubble settings window 202. Specifically, the user can be able to specify that text bubbles of a certain age (e.g., older than one minute) can be removed automatically by the messaging component 118.

In some implementations, eliminating the display of a text bubble can result in a visual effect associated with the text bubble's removal. For example, if the user clicks on a text bubble to remove the bubble, then a graphical representation of a bursting bubble can be displayed. In some implementations, an audible sound can also occur, such as the popping sound of a bursting bubble.

In some implementations, hovering (e.g., with the cursor) over a text bubble can produce an additional visual and/or audible result. For example, if the user hovers over a text bubble presenting only a portion of a received message, the entire text of the message can be displayed, such as in a box positioned adjacent to the text bubble. Subsequent removal of the cursor from over the text bubble can make the box containing the entire message disappear again. In some implementations, hovering over a text bubble can initiate a speech synthesizer to recite the full-text message represented by the text bubble.

In some implementations, when a text bubble is displayed, a bell, chime, or other such audible notification can be sounded. Such a sound can alert the user that a message bubble has been displayed. This can be useful, for example, if the user is currently looking away from the computer. In some implementations, the user can be able to configure the messaging system 118 to play a different sound for each of the user's different contacts. For example, the user can use controls in the text bubble settings 204 that allow the user to select and associate sound-bites with particular contacts. In this way, if the user is looking away from the computer for some reason, the user can differentiate among text bubbles received from different contacts, for example, without viewing the computer. In some implementations, when a new text bubble is displayed, the text bubble can flash for a moment (e.g., a few seconds) in order, for example, to alert the user to the newest text bubble.

In some implementations, the text bubble settings 204 can include controls for the user to specify the user's contacts for which text bubbles are displayed and/or received. For example, a teenage user may prefer to have text bubbles displayed for messages received from his or her teenage friends, but may prefer not to have text bubbles displayed at all for messages received from the user's parents.

Figure 4:
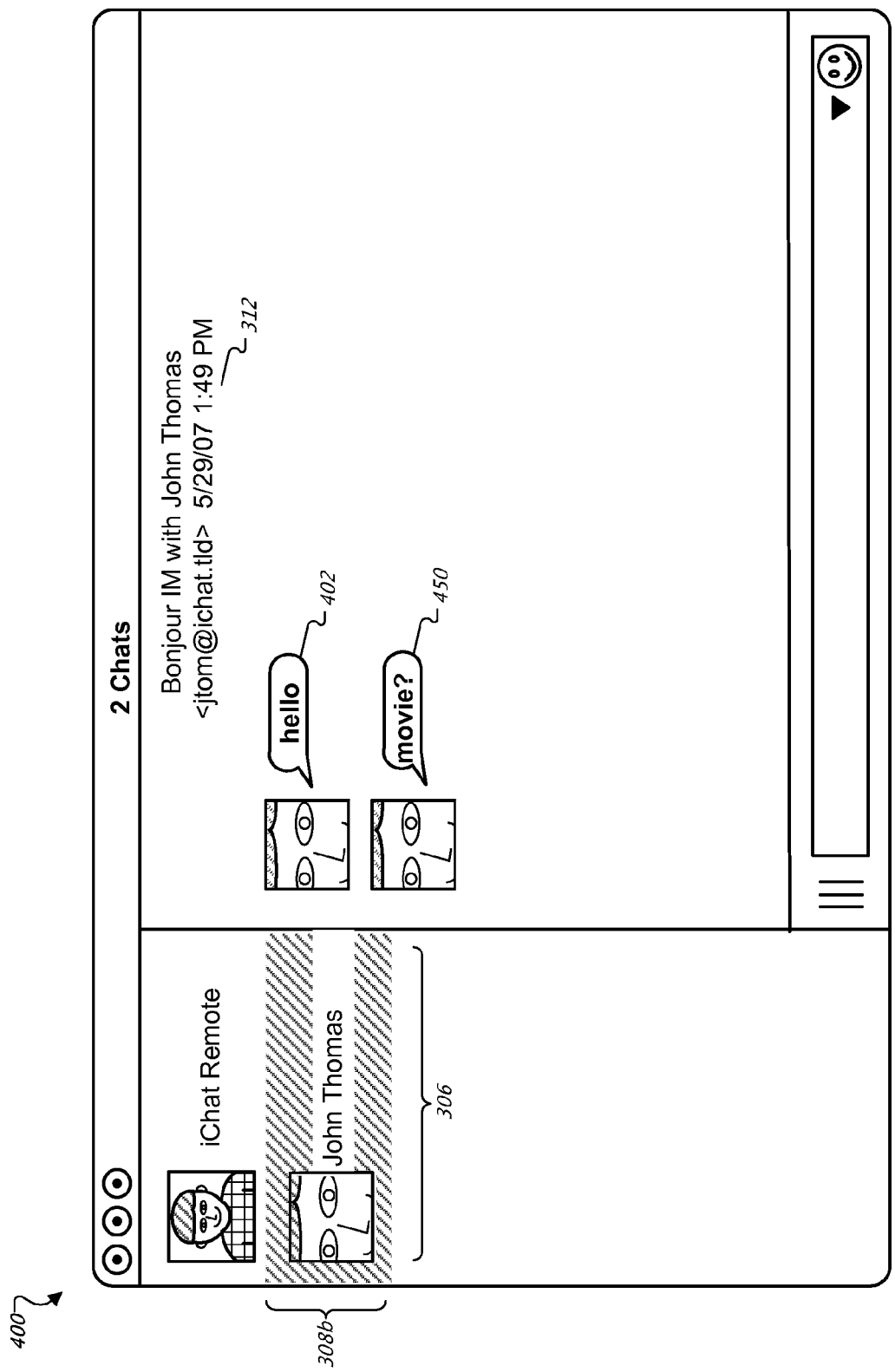

FIG. 4 is screen shot 400 depicting a chat conversation between a user and a selected chat participant. For example, the "hello" message 402 is a message received from the "John Thomas" contact 308b currently highlighted (as indicated by back-shading) in the list of contacts 306. As depicted, the contact identification message 312 is updated to correspond to the "John Thomas" contact 308b highlighted in the list of contacts 306. The chat conversation is also updated to include the message 450 that had previously been presented in the text bubble 350.

Figure 5:
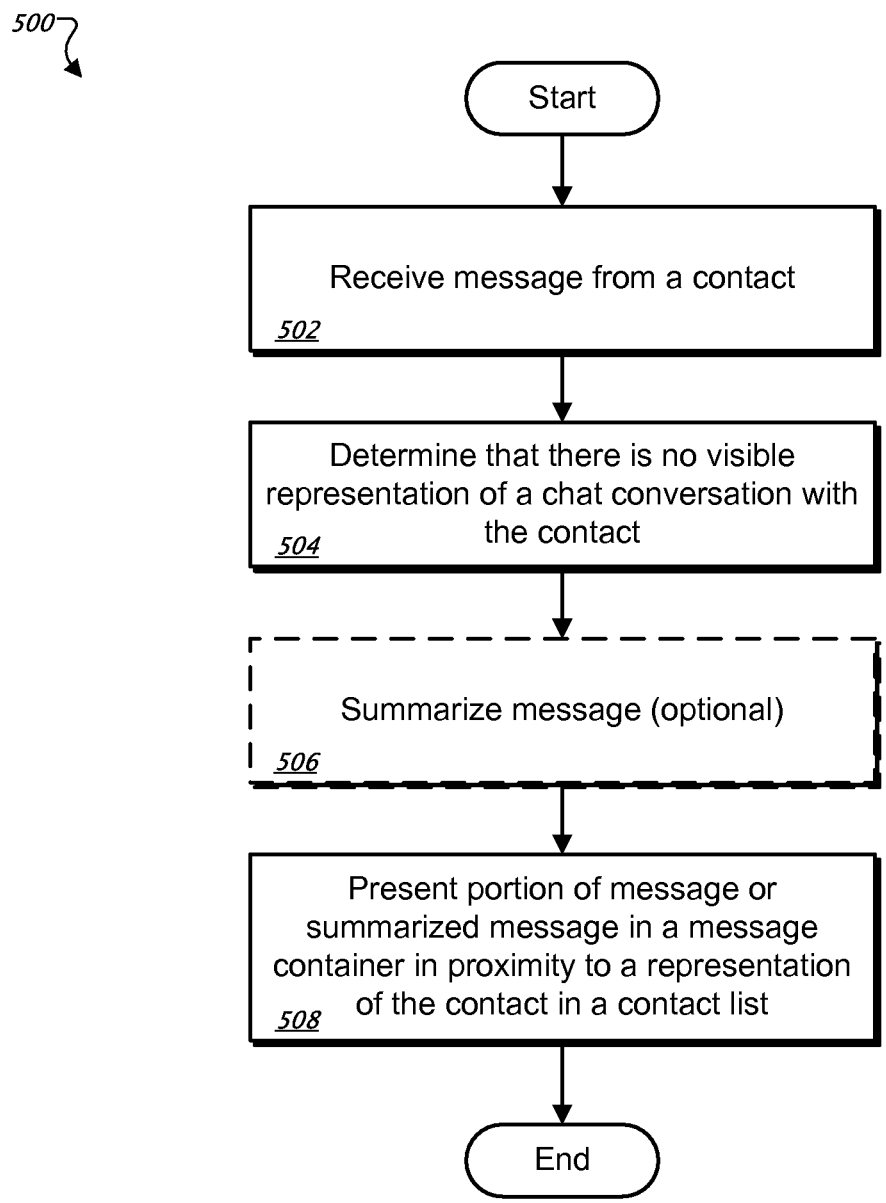
FIG. 5 is a flow chart of an example method for displaying a text bubble.

FIG. 5 is a flow diagram of an example method 500 for presenting a message container including at least a portion of a text message or a summary of a text message in proximity to a representation of the sender of the message. The method 500 can be performed using the architecture 100 (FIG. 1), for example. Step 502 receives a message from a contact. The message can be, for example, an instant message sent from a sender to a receiver across the network 108. The message can be received by the messaging component 118.

In step 504, a determination is made that there is no visible representation of a chat conversation with the contact. In one example, the user receiving the instant message can be viewing a list of contacts, but a chat conversation window for the contact who sent the message (e.g., the message received in step 502) may not exist. In some implementations, the chat conversation may be visible in another window, but partially or completely hidden behind one or more other windows, such as in a multi-window environment.

Optionally, at step 506, the message is summarized. For example, a message summary can include the initial words or characters of the message followed by ellipses. In another example, the received message can be parsed for key words or phrases which can be included in a message summary. In another example, the message received can be sufficiently short (e.g., less than a pre-determined character length, such as 20) so that no summary is determined.

At step 508, at least a portion of the message or the summarized message is presented in a message container (e.g., presented in a stylized text bubble) in proximity to a representation of the contact in a contact list. In one example, the message container can be displayed adjacent to the name of the contact. For example, referring to FIG. 3, a bubble such as any of text bubbles 302a-302d can be displayed. In particular, the text bubble is displayed in proximity to the image or name of the contact. If one or more text bubbles are already displayed for that contact, the one or more text bubbles and/or the new text bubble can be repositioned.

In the above description, for purposes of explanation, numerous specific details are set forth in order to provide a thorough understanding. It will be apparent, however, to one skilled in the art that implementations can be practiced without these specific details. In other instances, structures and devices are shown in block diagram form in order to avoid obscuring the disclosure.

In particular, one skilled in the art will recognize that other architectures and graphics environments can be used, and that the examples can be implemented using graphics tools and products other than those described above. In particular, the client/server approach is merely one example of an architecture for providing the functionality described herein; one skilled in the art will recognize that other, non-client/server approaches can also be used. Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the operations herein can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it can prove convenient to construct more specialized apparatuses to perform the method steps. The required structure for a variety of these systems will appear from the description. In addition, the present examples are not described with reference to any particular programming language. It will be appreciated that a variety of programming languages can be used to implement the teachings as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present description is in no way limited to implementation in any specific operating system or environment.

The subject matter described in this specification can be implemented as one or more computer program products, i.e., one or more modules of computer program instructions encoded on a computer readable medium for execution by, or to control the operation of, data processing apparatus. The instructions can be organized into modules (or engines) in different numbers and combinations from the exemplary modules described. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

While this specification contains many specifics, these should not be construed as limitations on the scope of what can be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing can be advantageous. Other variations are within the scope of the following claims.

What is claimed is:

1. A method, performed using at least one processor, comprising:
presenting a user interface that includes a first window portion and a second window portion that is separate from the first window portion, the first window portion being a contacts area listing a representation of each of a plurality of contacts including at least a first contact, and the second window portion being an active chat conversation area that displays a first active chat conversation associated with the first contact;
receiving a text message and determining whether the text message is associated with one of the plurality of contacts;
when it is determined that the text message is associated with the first contact and that a user is engaged in an active chat conversation with the first contact, presenting the text message as part of the first active chat conversation in the second window portion; and
when it is determined that the text message is associated with a second one of the plurality of contacts and that the user is not engaged in an active chat conversation with the second contact, presenting, in response to receiving the text message, a message container within the contacts area as part of a second inactive chat conversation associated with the second contact in the first window portion,
wherein the message container contains at least a portion of the text message that is presented within the contacts area as part of the second inactive chat conversation in association with the representation of the second contact without the user actively causing the presentation of at least the portion of the text message within the contacts area, and
wherein the second inactive chat conversation associated with the second contact is displayed in the first window portion simultaneously with the first active chat conversation associated with the first contact being displayed in the second window portion.

2. The method of claim 1, wherein presenting the message container containing at least a portion of the text message includes one or more of:
presenting an entire portion of the text message within the message container;
presenting a beginning portion of the text message within the message container; or
presenting a summary of the text message within the message container.

3. The method of claim 1, further comprising:
determining an appearance of the message container based on one of a plurality of message container styles.

4. The method of claim 3, wherein each message container style specifies one or more of:
a shape of the message container;
a color of the message container;
a border of the message container;
a color of text contained in the message container; or
a font of text contained in the message container.

5. The method of claim 3, further comprising:
receiving user input selecting the one of the plurality of message container styles.

6. The method of claim 1, further comprising:
receiving user input directed to the presentation of the message container; and
presenting the message container according to the user input.

7. The method of claim 1, further comprising:
removing the presentation of the message container after a determined period of time has elapsed since the presentation of the message container.

8. The method of claim 1, wherein the message container disappears after presenting the message container based on a user operation related to the message container to display the second inactive chat conversation in the second window portion as an active chat conversation.

9. At least one non-transitory computer-readable medium having instructions stored thereon, which, when executed by at least one processor, cause the at least one processor to perform operations comprising:
presenting a user interface that includes a first window portion and a second window portion that is separate from the first window portion, the first window portion being a contacts area listing a representation of each of a plurality of contacts including at least a first contact, and the second window portion being an active chat conversation area that displays a first active chat conversation associated with the first contact;
receiving a text message and determining whether the text message is associated with one of the plurality of contacts;
when it is determined that the text message is associated with the first contact and that a user is engaged in an active chat conversation with the first contact, presenting the text message as part of the first active chat conversation in the second window portion; and
when it is determined that the text message is associated with a second one of the plurality of contacts and that the user is not engaged in an active chat conversation with the second contact, presenting, in response to receiving the text message, a message container within the contacts area as part of a second inactive chat conversation associated with the second contact in the first window portion,
wherein the message container contains at least a portion of the text message that is presented within the contacts area as part of the second inactive chat conversation in association with the representation of the second contact without the user actively causing the presentation of at least the portion of the text message within the contacts area, and
wherein the second inactive chat conversation associated with the second contact is displayed in the first window portion simultaneously with the first active chat conversation associated with the first contact being displayed in the second window portion.

10. The computer-readable medium of claim 9, wherein the instructions to present the message container comprise instructions to cause the at least one processor to perform operations comprising one or more of:
presenting an entire portion of the text message within the message container;
presenting a beginning portion of the text message within the message container; or
presenting a summary of the text message within the message container.

11. The computer-readable medium of claim 9, wherein the operations further comprise:

determining an appearance of the message container based on one of a plurality of message container styles.

12. The computer-readable medium of claim 9, wherein the message container disappears after presenting the message container based on a user operation related to the message container to display the second inactive chat conversation in the second window portion as an active chat conversation.

13. A system comprising:
at least one processor; and
memory coupled to the at least one processor and storing instructions, which, when executed by the at least one processor, cause the at least one processor to perform operations comprising:
presenting a user interface that includes a first window portion and a second window portion that is separate from the first window portion, the first window portion being a contacts area listing a representation of each of a plurality of contacts including at least a first contact, and the second window portion being an active chat conversation area that displays a first active chat conversation associated with the first contact;
receiving a text message and determining whether the text message is associated with one of the plurality of contacts;
when it is determined that the text message is associated with the first contact and that a user is engaged in an active chat conversation with the first contact, presenting the text message as part of the first active chat conversation in the second window portion; and
when it is determined that the text message is associated with a second one of the plurality of contacts and that the user is not engaged in an active chat conversation with the second contact, presenting, in response to receiving the text message, a message container within the contacts area as part of a second inactive chat conversation associated with the second contact in the first window portion,
wherein the message container contains at least a portion of the text message that is presented within the contacts area as part of the second inactive chat conversation in association with the representation of the second contact without the user actively causing the presentation of at least the portion of the text message within the contacts area, and
wherein the second inactive chat conversation associated with the second contact is displayed in the first window portion simultaneously with the first active chat conversation associated with the first contact being displayed in the second window portion.

14. The system of claim 13, wherein the instructions that cause the at least one processor to present the message container comprise instructions that when executed by the at least one processor cause the at least one processor to perform operations comprising one or more of:
presenting an entire portion of the text message within the message container;
presenting a beginning portion of the text message within the message container; or
presenting a summary of the text message within the message container.

15. The method of claim 1, wherein presenting the text message at part of the first active chat conversation comprises presenting the text message with a plurality of previously communicated text messages associated with the first contact.

16. The method of claim 15, wherein presenting the text message as part of the first active chat conversation comprises presenting an image associated with the first contact proximate to the text message in the second window portion.

17. The method of claim 1, wherein presenting the user interface that includes the first window portion and the second window portion comprises presenting a contact identifier message in the second window portion, wherein the contact identifier message identifies the first contact whose first active chat conversation is presented in the second window portion.

18. The method of claim 17, wherein presenting the contact identifier message comprises presenting a time at which a communication session between the first contact and the user began.

19. The method of claim 1, further comprising:
receiving a selection of the representation of the second contact in the first window portion after the message container is displayed as part of the second inactive chat conversation in the contacts area in the first window portion; and
updating the active chat conversation area in the second window portion to display one or more messages of the second inactive chat conversation associated with the second contact in the second window portion based on the received selection.

20. The system of claim 13, wherein the system further comprises:
a display device coupled to the at least one processor, wherein the display device is configured to display the presented message container within the user interface; and
a network interface coupled to the at least one processor, wherein the network interface is configured to receive the text message from a network.

21. The method of claim 1, wherein presenting the message container within the contacts area as part of the second inactive chat conversation acts as a notification of the received text message associated with the second contact.

22. The method of claim 1, wherein the message container contains at least the portion of the text message that is readily viewable within the contacts area as part of the second inactive chat conversation in association with the representation of the second contact without the user actively causing the presentation of at least the portion of the text message within the contacts area.

* * * * *